United States Patent [19]

Oka et al.

[11] 4,311,715

[45] Jan. 19, 1982

[54] METHOD OF PREPARING ALBUMIN RICH FOODSTUFF RAW MATERIALS

[75] Inventors: Hideki Oka, Ueda; Keiji Itoga; Tsutomu Mochizuki, both of Nagano, all of Japan

[73] Assignee: Nagano Miso Kabushiki Kaisha, Nagano, Japan

[21] Appl. No.: 126,943

[22] Filed: Mar. 3, 1980

[51] Int. Cl.³ .......................... A23J 1/14; A23L 1/20
[52] U.S. Cl. ................................ 426/46; 426/64; 426/634
[58] Field of Search ..................... 426/46, 64, 634

[56] References Cited

U.S. PATENT DOCUMENTS 531,013  12/1894  Watson .............................. 426/634
3,937,844  2/1976  Koyama ............................. 426/46
4,140,802  2/1979  Kelly et al. ........................ 426/64

FOREIGN PATENT DOCUMENTS 139609  12/1950  Australia ............................ 426/46
51-48498  4/1976  Japan ................................ 426/46
52-90699  7/1977  Japan ................................ 426/46

*Primary Examiner*—Robert A. Yoncoskie
*Attorney, Agent, or Firm*—Birch, Stewart, Kolasch and Birch

[57] ABSTRACT

In preparing miso like albumin rich foodstuff raw material, malt of rice or the like is sterilized with ethyl alcohol or an aqueous solution thereof, the sterilized malt is admixed with steamed or boiled soya beans and the resulting mixture is aged at a temperature of 20° C.–50° C. for about one week or more.

6 Claims, No Drawings

METHOD OF PREPARING ALBUMIN RICH FOODSTUFF RAW MATERIALS

BACKGROUND OF THE INVENTION

This invention relates to a method of preparing albumin rich foodstuff raw material consisting essentially of soya beans and not containing salt.

Like meat, as a source of albumin, soya beans are important foodstuffs as a source of supplying albumin to human bodies. "Miso", one of the products of soya beans is an important foodstuff for Japanese. However, due to recent change in social life, especially due to decrease in hard labor, the quantity of salt required by human bodies is now decreasing. Too much salt affects the health (causing high blood pressure, kidney disease, etc.) so that it is necessary to limit the quantity of salt taken into human bodies. For this reason, attempts have been made, to develop foodstuffs containing little or no salt.

In a paper of H. Iwashita et al an Miso Technique No. 86 issued on Apr. 16, 1961 their is disclosed a method in which a mixture of boiled or steamed soya beans and a rice malt is maintained at a temperature of from 45° to 55° C. for 24–36 hours, then 3–5% by weight of 95% ethyl alcohol is incorporated at a temperature of about 40° C. Thereafter, the mixture is left to stand at room temperature for about one week to improve the flavor and taste and to age the mixture. When miso is prepared according to this method, acidification caused by usual live fungus, for example, lactic acid bacilli and aerotropic decomposing bacteria can be prevented by temperature control. However such a control device is bulky and expensive. Furthermore, according to this method, the mixture of the boiled or steamed soya beans and the rice malt is semi-solid, and moreover since the quantity of ethyl alcohol incorporated is extremely small, not only the mixing step is difficult to perform but also it is almost impossible to obtain a homogeneous mixture.

Japanese laid open patent specification No. 48498 of 1976 discloses a method of preparing soya bean miso in which all or a portion of the salt incorporated into a mixture of steamed or boiled soya beans is substituted by less than 100% by volume or preferably less than 5% by volume of alcohol for the purpose of preparing soya bean miso not containing or containing but a small quantity of salt. Although this method is more advantageous than the first mentioned method in that there is no difficulty to temperature control and incorporation of alcohol, where rice malt or wheat malt is used, substitution of alcohol of less than 5% by volume makes it difficult to suppress the adverse effect of the lactic acid bacilli or the like thus resulting in acidification. Consequently it is difficult to determine optimum aging interval. Even when the quantity of alcohol is increased beyond 5% by volume it is impossible to sufficiently suppress the adverse effect of the lactic acid bacilli, etc. When the quantity of alcohol approaches 10% by volume, the flavor of alcohol becomes remarkable thus degrading the quality of the product.

SUMMARY OF THE INVENTION

Accordingly, it is the principal object of this invention to provide a novel method of preparing albumin rich foodstuff raw material not containing salt which is inexpensive and can be used for a number of purposes.

We have found that the difficulties of the prior art methods can be eliminated by a novel method comprising the steps of immersing malt in ethyl alcohol or an aqueous solution thereof or incorporating ethyl alcohol or an aqueous solution thereof into malt to sterilize the same, then incorporating boiled or steamed soya beans and finally aging the mixture. The semisolid, paste like or rice-gruel like albumin rich foodstuff raw material prepared by this method can be pulverized after drying.

The ethyl alcohol utilized in this invention is a commercially available alcohol suitable to be added to foodstuffs, and the aqueous solution of the alcohol is prepared by diluting it with water suitable for drink.

The concentration of the aqueous solution of alcohol suitable for the method of this invention is at least about 15% alcohol and at this concentration there remains after sterilization a fungus level of about 2 to 4% of the original level.

TABLE I

| | Number of funguses in rice malt after immersion in an aqueous solution of alcohol | | | | | |
|---|---|---|---|---|---|---|
| | immersed for 15 min. | | immersed for 30 min. | | immersed for 60 min. | |
| | number of general live funguses | number of live funguses | number of general live funguses | number of live funguses | number of general live funguses | number of live funguses |
| not immersed | $4.2 \times 10^5$ 100% | $2.7 \times 10^5$ 100% | $4.2 \times 10^5$ 100% | $2.7 \times 10^5$ 100% | $4.2 \times 10^5$ 100% | $2.7 \times 10^5$ 100% |
| immersed in 93.5% by weight of alcohol aqueous solution | $5.9 \times 10^2$ 0.14% | $4.4 \times 10^2$ 0.16% | $6.5 \times 10^2$ 0.15% | $3.3 \times 10^2$ 0.12% | $5.4 \times 10^2$ 0.13% | $4.3 \times 10^2$ 0.16% |
| immersed in 75% by weight of alcohol aqueous solution | $5.8 \times 10^2$ 0.14% | $4.5 \times 10^2$ 0.17% | $5.2 \times 10^2$ 0.12% | $4.4 \times 10^2$ 0.16% | $5.8 \times 10^2$ 0.14% | $3.8 \times 10^2$ 0.14% |
| immersed in 55% by weight of alcohol aqueous solution | $3.9 \times 10^2$ 0.09% | $3.0 \times 10^2$ 0.11% | $3.7 \times 10^2$ 0.09% | $2.8 \times 10^2$ 0.10% | $3.7 \times 10^2$ 0.09% | $3.0 \times 10^2$ 0.11% |
| immersed in 35% by weight of alcohol aqueous solution | $1.1 \times 10^3$ 0.26% | $8.8 \times 10^2$ 0.33% | $8.6 \times 10^2$ 0.20% | $5.5 \times 10^2$ 0.20% | $8.0 \times 10^2$ 0.19% | $5.8 \times 10^2$ 0.21% |
| immersed in 15% by weight of alcohol | $1.5 \times 10^4$ 3.57% | $9.2 \times 10^3$ 3.41% | $9.2 \times 10^3$ 2.19% | $6.6 \times 10^3$ 2.44% | $7.8 \times 10^3$ 1.86% | $5.0 \times 10^3$ 1.85% |

TABLE I-continued

| Number of funguses in rice malt after immersion in an aqueous solution of alcohol | | | | | |
|---|---|---|---|---|---|
| immersed for 15 min. | | immersed for 30 min. | | immersed for 60 min. | |
| number of general live funguses | number of live funguses | number of general live funguses | number of live funguses | number of general live funguses | number of live funguses |
| aqueous solution | | | | | |

Remarks:
(a) in each case 100g of rice malt was immersed in 150 ml of an aqueous solution of alcohol
(b) method of measuring the number of live funguses
measurement of the number of general live funguses - cultivated with flat plate of Japanese isinglass (standard Japanese isinglass cultivation base, 48 hours)
measurement of the number of live funguses - cultivated with flat plate of Japanese isinglass (standard Japanese isinglass cultivation base + calcium carbonate + cabisizin (Registered Trade mark) 96 hours)
cultivation temp. - all 35° C.

Since the soya beans utilized in this invention are heat sterilized at the time of steaming, only the fungus originating from the malt causes acidification. As can be noted from Table I, as a result of immersion of the malt in alcohol or an aqueous solution thereof almost all of the funguses in the malt would be sterilized, thus making it possible to prepare albumin rich foodstuff raw material by the decomposition of the soya bean albumin without the necessity of suppressing growth of funguses with salt.

It was found that immersion of the malt in alcohol or an aqueous solution thereof does not deactivate enzymes in the malt to any appreciable extent. Especially, where a 75% alcohol aqueous solution is used no deactivation was noted as shown by the results of the experiment shown in the following Table II.

TABLE II

| | Protease Activity | | |
|---|---|---|---|
| | pH 3.0 | pH 6.0 | pH 7.5 |
| not immersed (standard) | (100%) | (100%) | (100%) |
| immersed in 93.5% alcohol aqueous solution for 60 min. | (93%) | (91%) | (92%) |
| immersed in 75% alcohol aqueous solution for 60 min. | (102%) | (102%) | (86%) |
| immersed in 55% alcohol aqueous solution for 60 min. | (86%) | (91%) | (90%) |
| immersed in 35% alcohol aqueous solution for 60 min. | (66%) | (73%) | (90%) |
| immersed in 15% alcohol aqueous solution for 60 min. | (72%) | (81%) | (76%) |

Immersion for about 15 minutes of the malt in alcohol or an aqueous solution thereof at room temperature is sufficient as can be noted from Table I. It is advantageous to admix the malt with soya beans after taking out the malt from alcohol or an aqueous solution thereof.

Where alcohol or its aqueous solution is incorporated into the malt it is advantageous to admix it with soya beans after sterilization without separating alcohol.

It is advantageous to mix together sterilized malt and steamed or boiled soya beans at a temperature of from 30° C. to 40° C.

The malt utilized in this invention is selected from the group consisting of rice malt, wheat malt, bean malt and malts of albuminous substances depending upon the intended use of the albumin rich foodstuffs raw material free from salt.

It is especially advantageous to add additional quantity of alcohol when malt treated with alcohol is admixed with the boiled or steamed soya beans.

Advantageously, the quantity of incorporation of ethyl alcohol or an aqueous solution thereof should be less than 5% by weight based on the sum of the weight of the soya beans and the malt in terms of the total alcohol concentration.

In practice, it is advantageous to perform the aging step of this invention at a temperature between 20° C. and 50° C., preferably between 30° C. and 40° C. Although the aging period is determined depending upon the aging temperature and the quantity of the malt used, a definite aging period should be determined in accordance with the intended use of the resulting foodstuff. When one considers the percentage of decomposition of the soya bean malt, more than one week or at least 10 days is sufficient.

The albumin rich foodstuff raw material of this invention obtained after aging can be used in many fields of application. For example, the foodstuff raw material in the form of a semisolid, a paste or a rice gruel can be suitably added to an ordinary miso to prepare miso containing a small quantity of salt, or to prepare a raw material of mayonnaise and sauce. It can also be used to prepare a spread by admixing it with butter or cheese or as raw materials to prepare soup, confectionary, bread, biscuit, etc.

To have a better understanding of the invention some typical examples of the method of this invention will now be described as follows.

EXAMPLE 1

6 Kg of rice malt dried for 20 hours at room temperature and having a water content of 20% was dipped for 30 minutes in 6 l of 93.5% ethyl alcohol (suitable for incorporation into foodstuffs). Then, the malt was taken out of the alcohol at which time the alcohol content of the malt was about 20% by weight. 40 Kg of soya beans which have been cooled to a temperature of about 45° C. after boiling or steamed was put into a stainless container having a capacity of 200 l and equipped with an agitator. After adding 1.1 Kg of the ethyl alcohol, the mixture in the container was admixed. At the end of this step, the temperature of the mixture was 40° C.

Thereafter the mixture was transferred into a polyvinyl chloride container having a capacity of 80 l, and maintained in a constant temperature room to effect aging.

The alcohol content, formol nitrogen content, pH value, color, etc. of the aged mixture were tested and its various characteristics were also tested respectively at 0, 5, 10 and 20th days after initiating the aging step and the results are shown in the following Table III. The control example (a) was prepared in the same manner as this Example 1 except that the rice malt was not sterilized by immersing it in alcohol but 2.5 Kg of the alcohol was added at the commencement of the aging (see Japanese laid open patent specification No. 48498/1976 referred to above).

EXAMPLE 2

The same process as in Example 1 was repeated except that the temperature of the boiled or steamed soya beans was changed to about 35° C. and that the temperature of the constant temperature room was held at 30° C. during the aging. The temperature of the contents in the aging container was 30° C. The same test and measurement as in Example 1 were made and results are also shown in Table III in which the control example (b) was prepared in the same manner as the control example (a).

TABLE III

| number of aging days | sample | water content (%) | alcohol (%) | formol nitrogen (%) | pH | color measured Y % | x | y | characteristics |
|---|---|---|---|---|---|---|---|---|---|
| 0 | a | 56.8 | 3.2 | | 6.23 | 24.3 | 0.398 | 0.390 | |
| | b | 57.3 | 3.0 | | 6.24 | 26.5 | 0.395 | 0.384 | |
| | 1 | 57.3 | 3.0 | | 6.30 | 25.0 | 0.399 | 0.384 | |
| | 2 | 56.2 | 3.2 | | 6.24 | 26.4 | 0.399 | 0.394 | |
| 5 | a | | 3.0 | 0.28 | 6.00 | 21.8 | 0.405 | 0.392 | a little bitter |
| | b | | 3.1 | 0.25 | 6.02 | 22.4 | 0.401 | 0.386 | acidic, a little |
| | 1 | | 3.0 | 0.21 | 6.00 | 21.8 | 0.404 | 0.393 | a little bitter |
| | 2 | | 3.1 | 0.18 | 6.10 | 22.3 | 0.398 | 0.383 | not aged, not yet aged flavor |
| 10 | a | | 2.7 | 0.61 | 5.71 | 20.9 | 0.409 | 0.392 | acidic, a little |
| | b | | 2.9 | 0.58 | 5.54 | 21.6 | 0.407 | 0.392 | acidified |
| | 1 | | 2.8 | 0.51 | 5.98 | 20.9 | 0.414 | 0.396 | good taste, a little bitter |
| | 2 | | 2.8 | 0.48 | 6.01 | 21.0 | 0.400 | 0.389 | a little flavor of not aged product |
| 20 | a | | 2.9 | 0.71 | 5.02 | 20.2 | 0.410 | 0.394 | acidified |
| | b | | 2.8 | 0.74 | 4.41 | 21.1 | 0.410 | 0.394 | acidified |
| | 1 | | 2.9 | 0.67 | 5.51 | 17.9 | 0.420 | 0.400 | excellent taste |
| | 2 | | 2.9 | 0.65 | 5.60 | 19.8 | 0.422 | 0.398 | has an appreciable taste, excellent |

The method of testing was as follows:
water content: drying under a reduced pressure
alcohol content: gas chromatography technique
formol nitrogen: standard method of analyzing miso
pH: measured without dilution
color measurement: photoelectric reflection meter made by Hitachi Seisakusho Type ERI-2

The color measurement in Table III was carried out according to CIE methods which is regulated by The International Illumination Committee. Since the fermenting foods are gradually colored with aging, the color measurement is significant in judging the degree of aging.

As can be noted from Table III, during the characteristic test the control samples (a) and (b) were acidified at the fifth and 10th days respectively. Both samples 1 and 2 showed favorable aging characteristics. Especially the sample 1 showed excellent taste at 20th day. Although sample 1 was not yet completely aged at 10th day but at 20th day it showed stable taste and excellent color.

As above described in the cases of control samples (a) and (b) it was considered that live acid fungus became active regardless of the mixing temperature and the aging temperature. In the samples 1 and 2 of this invention it is to be noted that no acidification has occurred under the same temperature condition.

In samples 1 and 2 the amount of the formol nitrogen were respectively 0.67% and 0.65% after aging for 20 days. Which shows that the percentage of decomposition of albumin is high when one considers the fact that the quantity of the holmol nitrogen of ordinary miso is about 0.45%.

The albumin rich foodstuff raw material prepared by the process of Example 1 did not contain any salt and was analyzed and found to have the following nutrient compositions (a) vitamine $B_1$—0.17 mg %, vitamine $B_2$—0.22 mg %, water content—1.5% (measured by drying method under a reduced pressure), albumin—31.8% (coefficient 5.71), oil—17.9% (Soxhlet extraction method), fiber—4.0% ash—3.5%, sugar—41.5%, salt (as NaCl)—68.9 mg %, calcium 257 mg %; (b) 100 g of a powder of the albumin rich foodstuff raw material not containing salt. Its calorie value 445 was calculated based on the following values: albumin—3.47%, oil 8.37%, fiber and sugar 4.07%.

EXAMPLE 3

3 Kg of rice malt was dipped for one hour in 3 l of 93.5% alcohol which is suitable to prepare foodstuffs and then taken out of the alcohol. The alcohol content of the malt thus treated was about 20% by weight. 15 Kg of soya beans which have been cooled to 35° C. after boiling or steaming was put in a steel container having a volume of 100 l and provided with an agitator together with the malt dipped in alcohol and mixed together. The temperature of the mixture at the start of the mixing operation was 30° C.

After completion of the mixing operation the mixture was transferred into a polyvinyl chloride container having a volume of 20 l and maintained in a constant temperature room held at 30° C. thus causing the mixture to age. The water content, pH value, alcohol content, color, number of live funguses, the percentage of dissolved nitrogen, the percentage of nitrogen decomposition of the aged mixture were measured and its various characteristics were also determined at 0th, 4th, 11th, 20th and 37th days and the results are shown in the following Table IV.

EXAMPLE 4

The same process steps as in Example 3 were repeated except that 0.3 l of 93.5% alcohol was added at the time of admixing. The results of measurement regarding aged material are also shown in Table IV.

EXAMPLE 5

TABLE IV

| aging days | example No. | water content (%) | pH | alcohol (%) | color measured Y (%) | x | y | general live funguses | live acidic fungus | percentage of dissolved nitrogen | percentage of decomposed nitrogen | characteristics |
|---|---|---|---|---|---|---|---|---|---|---|---|---|
| 0 | control example (C) | 52.8 | 6.25 | 3.88 | 33.8 | 0.387 | 0.390 | $1.8 \times 10^5$ | | | | |
| | 3 | 51.9 | 6.27 | 3.30 | 33.5 | 0.387 | 0.392 | $4.8 \times 10^3$ | $3.1 \times 10^3$ | | | |
| | 4 | 52.3 | 6.25 | 4.42 | 33.8 | 0.390 | 0.398 | $5.6 \times 10^3$ | $3.8 \times 10^3$ | | | |
| | 5 | 52.5 | 6.23 | 5.20 | 32.9 | 0.393 | 0.396 | $6.1 \times 10^3$ | $2.7 \times 10^3$ | | | |
| | 6 | 51.7 | 6.25 | 3.92 | 33.2 | 0.390 | 0.396 | $6.1 \times 10^3$ | $3.7 \times 10^3$ | | | |
| 5 | control example (C) | 52.0 | 5.83 | 3.77 | 30.5 | 0.395 | 0.398 | | | | | |
| | 3 | 51.8 | 5.97 | 3.28 | 30.5 | 0.393 | 0.399 | | | | | |
| | 4 | 52.5 | 6.01 | 4.60 | 31.7 | 0.393 | 0.399 | | | | | |
| | 5 | 51.2 | 6.02 | 4.98 | 31.2 | 0.395 | 0.398 | | | | | |
| | 5 | 51.2 | 6.02 | 4.98 | 31.2 | 0.395 | 0.398 | | | | | |
| | 6 | 52.0 | 5.97 | 3.90 | 30.7 | 0.395 | 0.396 | | | | | |
| 11 | control example (C) | 51.7 | 4.55 | 3.78 | 29.2 | 0.415 | 0.402 | $8.5 \times 10^6$ | $7.0 \times 10^6$ | 53.7 | 18.8 | acidic, strong acidic flavor |
| | 3 | 51.1 | 5.79 | 3.30 | 28.8 | 0.399 | 0.399 | $3.2 \times 10^3$ | $1.0 \times 10^3$ | 48.3 | 11.8 | bitter |
| | 4 | 51.8 | 5.82 | 4.67 | 27.2 | 0.401 | 0.402 | $7.7 \times 10^2$ | $6.2 \times 10^2$ | 49.0 | 11.6 | somewhat not yet aged flavor |
| | 5 | 50.8 | 5.82 | 5.00 | 28.5 | 0.399 | 0.400 | $3.8 \times 10^2$ | $2.2 \times 10^2$ | 47.7 | 11.9 | somewhat not yet aged flavor |
| | 6 | 50.9 | 5.80 | 3.92 | 28.5 | 0.403 | 0.404 | $1.5 \times 10^3$ | $1.6 \times 10^3$ | 49.2 | 12.0 | bitter |
| 20 | control example (C) | 50.6 | 4.38 | 3.52 | 27.8 | 0.417 | 0.408 | $5.0 \times 10^6$ | $3.6 \times 10^6$ | 66.0 | 25.4 | acidified |
| | 3 | 50.3 | 5.72 | 3.22 | 24.3 | 0.410 | 0.388 | $9.7 \times 10^2$ | $5.2 \times 10^2$ | 60.9 | 19.7 | good taste, bitter |
| | 4 | 51.1 | 5.75 | 4.05 | 24.9 | 0.410 | 0.378 | $3.0 \times 10^2$ | $1.7 \times 10^2$ | 59.2 | 18.1 | good taste, somewhat bitter |
| | 5 | 49.7 | 5.70 | 4.62 | 25.2 | 0.408 | 0.380 | $10^2 >$ | $10^2 >$ | 61.1 | 18.4 | good taste, somewhat bitter |
| | 6 | 50.0 | 5.70 | 3.73 | 23.7 | 0.412 | 0.382 | $6.8 \times 10^2$ | $4.1 \times 10^2$ | 61.5 | 19.8 | good taste, bitter |
| 36 | control example (C) | 50.2 | 4.35 | 3.44 | 27.1 | 0.420 | 0.406 | $4.0 \times 10^6$ | $1.2 \times 10^6$ | 68.8 | 28.6 | acidified |
| | 3 | 50.5 | 5.33 | 3.01 | 17.5 | 0.438 | 0.370 | $1.9 \times 10^2$ | $1.0 \times 10^2$ | 62.3 | 24.9 | excellent taste |
| | 4 | 51.0 | 5.38 | 3.78 | 18.3 | 0.426 | 0.362 | $5.8 \times 10$ | $3.2 \times 10$ | 61.4 | 23.3 | good taste |
| | 5 | 49.5 | 5.45 | 4.84 | 17.8 | 0.428 | 0.375 | $3.0 \times 10$ | $1.1 \times 10$ | 62.0 | 23.7 | appreciably good taste |
| | 6 | 50.3 | 5.35 | 3.56 | 17.3 | 0.440 | 0.372 | $2.3 \times 10^2$ | $2.0 \times 10^2$ | 62.4 | 25.1 | excellent taste |

Again the process steps of Example 3 were repeated except that 0.2 l of 93.5% alcohol was added to the boiled or steamed soya beans and that 0.3 l of 93.5% alcohol was incorporated at the time of mixing and the results are also shown in the same table.

EXAMPLE 6

1.0 l of 93.5% alcohol was sprinkled on 3 Kg of rice malt and admixed therewith. After standing for 30 minutes, 15 Kg of soya beans which have been boiled or steamed and then cooled to a temperature of about 35° C. was put in a steel container provided with an agitator and having a capacity of 100 l, and then the rice malt was added and admixed with the soya beans. The aged product was tested in the same manner as in Example 3 and the results are shown in the following Table IV.

Control sample (C)

The process steps of Example 3 were repeated except that the alcohol treatment of the rice malt was not performed and that 1.0 l of 93.5% alcohol was incorporated at the time of admixing the ingredients. The aged product was tested in the same manner as in Example 3 and the results are also shown in the following Table IV.

As can be noted from Table IV, where the rice malt was immersed in alcohol (examples 3, 4 and 5) and where the alcohol was sprinkled (example 6), the number of general live funguses and of the live acidic funguses is much smaller than that of the control example (C) wherein alcohol was incorporated only at the time of admixing the ingredients. In addition, the control example (C) was completely acidified at the 11th day of the aging but in the Examples 3-6 of this invention the mixture was aged satisfactory.

About 25% of nitrogen decomposition is sufficient but it is considered that this value could be increased with more aging days.

Some examples of the application of the albumin rich foodstuff raw material of this invention are as follows.

1. Mayonnaise

At present, deutoplasm, the yolk of an egg, capable of emulsifying is used as the raw material for preparing mayonnaise but the deutoplasm contains about 1213 mg/100 g of cholesterol which is extremely higher than that of other foodstuffs thus causing high blood pressure and arteriosclerosis. Where an emulsion of the albumin rich foodstuff raw material of this invention is substituted for the deutoplasm all raw materials utilized to prepare mayonnaise become digestible.

The formulations of a conventional mayonnaise (No. 1), that utilizes as the deutoplasm the raw material of Example 1 of this invention (No. 2), and that utilizing only the raw material of Example 1 (No. 3) are shown in the following Table V.

TABLE V

| raw material | No. 1 | No. 2 | No. 3 |
|---|---|---|---|
| salad oil | 75% by weight | 75% by weight | 50% by weight |
| vinegar | 9% by weight | 9% by weight | 20% by weight |
| salt | 2% by weight | 2% by weight | 2% by weight |
| sugar | 2% by weight | 2% by weight | 2% by weight |
| sodium glutamate | 0.1% by weight | 0.1% by weight | 0.1% by weight |
| European kneaded mustard | 0.9% by weight | 0.9% by weight | 0.9% by weight |
| deutoplasm | 11% by weight | 5.5% by weight | 0% by weight |
| albumin rich foodstuff raw material of Example 1 | 0% by weight | 5.5% by weight | 25% by weight |

The three types of the mayonnaise having the ingredients described above had substantially the same color and viscosity and their characteristics were measured according to the following conditions.
  number of panel members—15
  sampling—mayonnaise alone was sampled
  method of grading—method of numbering (1 is most excellent, 2 is the next . . . . )
The results of test are shown in the following Tables VI and VII.

TABLE VI

| | Sample Type of mayonnaise | | |
|---|---|---|---|
| panel | No. 1 | No. 2 | No. 3 |
| 1 | 2 | 1 | 3 |
| 2 | 3 | 2 | 1 |
| 3 | 1 | 2 | 3 |
| 4 | 1 | 2 | 3 |
| 5 | 2 | 1 | 3 |
| 6 | 3 | 1 | 2 |
| 7 | 2 | 1 | 3 |
| 8 | 3 | 2 | 1 |
| 9 | 3 | 1 | 2 |
| 10 | 1 | 3 | 2 |
| 11 | 3 | 2 | 1 |
| 12 | 1 | 2 | 3 |
| 13 | 1 | 2 | 3 |
| 14 | 3 | 2 | 1 |
| 15 | 2 | 1 | 3 |
| Total | 31 | 25 | 34 |
| Average | 2.06 | 1.67 | 2.67 |

TABLE VII

| t-distribution Determination of the Difference in the Usefulness | | | |
|---|---|---|---|
| comparison | $t_o$ | t(14 0.05) | t(14 0.01) |
| No. 1 - No. 2 | 1.205 | 2.145 | 2.977 |
| No. 1 - No. 3 | 0.450 | 2.145 | 2.977 |
| No. 2 - No. 3 | 2.469* | 2.145 | 2.977 |

*Useful

As can be noted, type No. 2 has excellent taste and a difference in the usefulness can be noted between types No. 2 and 3. However, certain persons like No. 3 showing difference in taste.

2. Use as miso containing low quantity of salt

Miso has been an important foodstuff for Japanese as a source of albumin, oil and salt. However, with recent change in taste, demand for miso is now decreasing.

Among a number of reasons may be mentioned a large quantity of salt contained in miso which is not suitable for taste of some of the Japanese. An average quantity of salt taken by a Japanese is said to be 10-15 g/day and one cup of miso soup contains about 2.5 g of salt. Miso contains a large quantity of albumin and amino acid necessary for Japanese. Accordingly, it is presently necessary to decrease the salt content for increasing demand.

Decrease in the salt quantity of miso increases the demand therefor for condiments and for treating foodstuffs. In the prior art miso containing less than 12% of salt is not suitable for storage but according to this invention it is possible to freely adjust the salt concentration. Low salt content miso was prepared by admixing the prior art miso containing 12.5% by weight of salt and the albumin rich foodstuff raw material containing no salt prepared by Example 1 according to the formulation shown in the following Table VIII.

TABLE VIII

| | Sample | | | | | | |
|---|---|---|---|---|---|---|---|
| | No. 1 | No. 2 | No. 3 | No. 4 | No. 5 | No. 6 | No. 7 |
| prior art miso | 100 | 88 | 80 | 72 | 64 | 56 | 48 |
| the foodstuff raw material of Example 1 | 0 | 12 | 20 | 28 | 36 | 44 | 52 |
| salt content | 12.5% | 11% | 10% | 9% | 8% | 7% | 6% |

The low salt content miso thus prepared had substantially the same appearance as the prior art commercially available miso.

The characteristics of samples 1-7 were tested in the following manner.
  number of panel members: 15 house wives
  method of sampling: Miso soup was prepared in a conventional manner by using 20 g of the low salt containing miso, 140 ml of water, a small quantity of condiments, and a suitable quantity of bean curds and wakame seaweed (undaria pinnatifida) and each member tasted the miso jouce.
  method of grading: Graded according to numbers, that is 1 (good), 2 (normal) and 3 (bad).

The results are shown in the following Tables IX and X.

TABLE IX

| | Sample | | | | | | |
|---|---|---|---|---|---|---|---|
| panel | No. 1 | No. 2 | No. 3 | No. 4 | No. 5 | No. 6 | No. 7 |
| 1 | 3 | 3 | 1 | 1 | 1 | 1 | 2 |
| 2 | 3 | 3 | 1 | 2 | 2 | 3 | 3 |
| 3 | 3 | 3 | 3 | 1 | 2 | 2 | 3 |
| 4 | 2 | 2 | 2 | 2 | 1 | 2 | 2 |
| 5 | 1 | 1 | 2 | 2 | 2 | 3 | 3 |
| 6 | 3 | 3 | 2 | 2 | 1 | 2 | 3 |
| 7 | 3 | 1 | 1 | 1 | 1 | 2 | 2 |
| 8 | 2 | 2 | 2 | 1 | 1 | 1 | 1 |
| 9 | 2 | 3 | 2 | 2 | 1 | 3 | 3 |
| 10 | 3 | 2 | 2 | 2 | 1 | 2 | 2 |
| 11 | 3 | 3 | 2 | 1 | 2 | 2 | 3 |
| 12 | 2 | 2 | 1 | 1 | 1 | 1 | 3 |
| 13 | 2 | 1 | 3 | 3 | 3 | 3 | 3 |
| 14 | 3 | 2 | 2 | 1 | 2 | 2 | 2 |
| 15 | 3 | 3 | 2 | 2 | 2 | 2 | 3 |
| Total | 38 | 34 | 28 | 24 | 23 | 31 | 38 |

TABLE IX-continued

| panel | Sample | | | | | | |
|---|---|---|---|---|---|---|---|
| | No. 1 | No. 2 | No. 3 | No. 4 | No. 5 | No. 6 | No. 7 |
| average | 2.53 | 2.27 | 1.87 | 1.60 | 1.53 | 2.07 | 2.53 |

TABLE X

| | t-distribution determination of the difference in the usefulness | | |
|---|---|---|---|
| comparison | $t_o$ | t(14 0.05) | t(14 0.01) |
| No. 1 - No. 2 | 1.428 | 2.145 | 2.977 |
| No. 1 - No. 3 | 2.575* | 2.145 | 2.977 |
| No. 1 - No. 4 | 3.388* | 2.145 | 2.977 |
| No. 1 - No. 5 | 4.021** | 2.145 | 2.977 |
| No. 1 - No. 6 | 1.648 | 2.145 | 2.977 |
| No. 1 - No. 7 | 0 | 2.145 | 2.977 |
| No. 2 - No. 3 | 1.411 | 2.145 | 2.977 |
| No. 2 - No. 4 | 2.247* | 2.145 | 2.977 |
| No. 2 - No. 5 | 2.492* | 2.145 | 2.977 |
| No. 2 - No. 6 | 0.650 | 2.145 | 2.977 |
| No. 2 - No. 7 | 1.135 | 2.145 | 2.977 |
| No. 3 - No. 4 | 1.426 | 2.145 | 2.977 |
| No. 3 - No. 5 | 2.008 | 2.145 | 2.977 |
| No. 3 - No. 6 | 0.971 | 2.145 | 2.977 |
| No. 3 - No. 7 | 3.427** | 2.145 | 2.977 |
| No. 4 - No. 5 | 3.358 | 2.145 | 2.977 |
| No. 4 - No. 6 | 3.424** | 2.145 | 2.977 |
| No. 4 - No. 7 | 4.653** | 2.145 | 2.977 |
| No. 5 - No. 6 | 2.729* | 2.145 | 2.977 |
| No. 5 - No. 7 | 5.754** | 2.145 | 2.977 |
| No. 6 - No. 7 | 2.729* | 2.145 | 2.977 |

*there is difference in the usefulness
**there is remarkable difference in the usefulness.

These Tables show that sample No. 5 (salt content 8%) has excellent characteristics and is more useful than samples other than samples No. 3 and No. 4.

A storage test of the low salt content was carried out in the following manners.

The albumin rich foodstuff raw material according to Example 1 and commercially available prior miso were mixed together at a ratio of 37:63 to obtain low salt content miso and 500 g thereof was contained in a small bag consisting of a mixture consisting of 20 parts of OPP 17 parts of Epar (Registered Trade Mark) and 50 parts of polyethylene to prepare a sample 1. As a control, 500 g of the prior art miso was contained in a similar small bag to obtain a sample 2. These samples were maintained in a constant temperature room held at 30° C., and the alcohol concentration, color, pH value and generation of $CO_2$ by the malt fungus were measured at 0th, 10th, and 30 days. The results of measurement are shown in the following Table XI.

TABLE XI

| number of days stored | sample | salt content (%) | water content (%) | alcohol (%) | pH | measured color | | | $CO_2$ generated |
|---|---|---|---|---|---|---|---|---|---|
| | | | | | | y % | x | y | |
| 0 | 1 | 8.46 | 55.1 | 2.5 | 5.20 | 14.1 | 0.442 | 0.399 | |
| | 2 | 12.98 | 51.0 | 2.0 | 5.02 | 15.6 | 0.436 | 0.407 | |
| 10 | 1 | | | 2.7 | 5.10 | 11.7 | 0.453 | 0.398 | — |
| | 2 | | | 2.5 | 4.96 | 13.1 | 0.449 | 0.396 | — |
| 20 | 1 | | | 2.4 | 5.05 | 10.1 | 0.454 | 0.399 | — |
| | 2 | | | 2.2 | 4.95 | 11.1 | 0.466 | 0.388 | — |
| 30 | 1 | | | 2.7 | 5.08 | 8.0 | 0.460 | 0.398 | — |
| | 2 | | | 2.4 | 4.95 | 9.2 | 0.468 | 0.390 | — |

This Table shows that both the commercial miso and the low salt content miso have an excellent storage property as well as excellent characteristics. The taste is excellent which does not vary with the number of days stored. After 30 days (at 30° C.) the low salt content miso had the same pH value and Y value and their tendency of varying is the same showing high storage capability.

The measured number of the general live funguses at the 0th and 30th days are shown in the following Table XII.

TABLE XII

| days | sample | number of general live funguses |
|---|---|---|
| 0 | 1 | $7.8 \times 10^2$ |
| | 2 | $2.4 \times 10^3$ |
| 30 | 1 | $7.1 \times 10^2$ |
| | 2 | $3.0 \times 10^3$ |

As this Table XII shows, the number of the live funguses of the low salt content miso is of the order of $10^2$ and does not vary even after 30 days showing that there is no fear of acidification and decomposition.

3. Use of the foodstuff raw material of this invention as treating raw material

Since in the albumin rich foodstuff raw material of this invention, the soya bean albumin is decomposed by the enzymes of the malt to increase digestibility and taste it is suitable to use it as the raw material for preparing confectionaries, soups condiments or other foodstuffs. For example, cookies may be prepared according to the formulations as shown in the following Table XIII.

TABLE XIII

| raw material | formulation 1 | formulation 2 |
|---|---|---|
| albumin rich foodstuff raw material according to Ex. 1 | 50 g | 0 |
| flour | 50 g | 100 g |
| butter | 40 g | 40 g |
| sugar | 27 g | 27 g |
| baking powder | 1 g | 1 g |
| salt | 0.5 g | 0.5 g |
| water | 23 cc | 23 cc |

Mixtures according to the formulations 1 and 2 were baked at a temperatures of 180° C. for 20 minutes.

The cookie utilizing the formulation 1 had an excellent flavor and taste. The cookie utilizing the formulation 2, which has the flavor of the flour did not taste as good as that utilizing composition 1.

4. Utilization of the albumin rich foodstuff raw material in the form of a powder The albumin rich foodstuff raw material of this invention is less water absorbent so that it is not easily denatured. According, its powder can be widely used as albumin rich foodstuff as the raw material for preparing instant foodstuffs, condiments and the like. For example, to use the powder to prepare soup the following formulation can be used.

flour: 12 g
butter: 13 g
the powder of this invention: 15 g
deoiled milk powder: 30 g
water: 400 cc The soup thus prepared tastes good and does not require to use another condiments, and is more excellent than commercially available instant potage.

5. Utilization as a high amino acid containing raw material

Since the albumin rich foodstuff raw material of this invention contains a large quantity of amino acid, it can be used as amino acid liquid or a raw materials for preparing sauce and dressing.

6. Utilization as the raw material for preparing albumin rich high calorie foodstuffs Since the albumin rich foodstuff raw material contains a large quantity of soya bean albumin and vegitable oil it can be utilized to improve nutritious value. However when it is admixed with cheese, butter or almond it is possible to prepare albumin rich high calorie foodstuffs.

7. Utilization as a foodstuff for preventing and recovering such diseases as high blood pressure, arteriosclerosis, kidney and heart diseases As the product of this invention contains a large quantity of linolenic acid it is effective to prevent deposition of cholesterol. Moreover as the foodstuff raw material of this invention does not contain salt it is useful to prevent and remedy these diseases.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of preparing albumin rich foodstuff raw material in the absence of salt comprising the steps of sterilizing malt by immersing the same in ethyl alcohol or an aqueous solution thereof having a concentration of at least 15% alcohol, boiling or steaming soya beans, mixing the sterilized malt with the steamed or boiled soya beans to form a mixture containing an added quantity of ethyl alcohol, said quantity of ethyl alcohol present in said mixture of malt and soya beans being at least about 3% and less than about 5% by weight based on the combined weight of the soya beans and the malt, and aging the resulting mixture for a time and at a temperature sufficient to produce said albumin rich foodstuff raw material.

2. The method according to claim 1 wherein said aging is carried out at a temperature of from 20° C. to 50° C. for at least ten days.

3. The method according to claim 1 wherein said malt is selected from the group consisting of rice malt, wheat malt, and bean malt.

4. The method of claim 1 wherein said immersion is for about 15 minutes at room temperature.

5. The method of claim 1 wherein said malt and soya beans are mixed together at a temperature of from 30° C. to 40° C.

6. A albumin rich foodstuff raw material prepared according to the process of claim 1.

* * * * *